(12) United States Patent
Cousins et al.

(10) Patent No.: US 11,926,527 B2
(45) Date of Patent: Mar. 12, 2024

(54) FURNACE CONTROL METHOD

(71) Applicant: JOHNSON MATTHEY PUBLIC LIMITED COMPANY, London (GB)

(72) Inventors: Matthew John Cousins, Billingham (GB); Michael Davies, Billingham (GB); John David Pach, Billingham (GB)

(73) Assignee: Johnson Matthey Public Limited Company, London (GB)

( * ) Notice: Subject to any disclaimer, the term of this patent is extended or adjusted under 35 U.S.C. 154(b) by 525 days.

(21) Appl. No.: 17/275,530

(22) PCT Filed: Aug. 30, 2019

(86) PCT No.: PCT/GB2019/052424
§ 371 (c)(1),
(2) Date: Mar. 11, 2021

(87) PCT Pub. No.: WO2020/099819
PCT Pub. Date: May 22, 2020

(65) Prior Publication Data
US 2022/0048767 A1 Feb. 17, 2022

(30) Foreign Application Priority Data

Nov. 12, 2018 (GB) ...................................... 1818398

(51) Int. Cl.
*G01J 3/00* (2006.01)
*B01J 19/00* (2006.01)
(Continued)

(52) U.S. Cl.
CPC ........... *C01B 3/384* (2013.01); *B01J 19/0033* (2013.01); *B01J 19/2415* (2013.01); *F23N 1/002* (2013.01);
(Continued)

(58) Field of Classification Search
CPC ............ C01B 3/384; C01B 2203/0233; C01B 2203/0811; C01B 2203/1619;
(Continued)

(56) References Cited

U.S. PATENT DOCUMENTS 8,219,247 B2   7/2012 Esmaili et al.
8,848,192 B2 *  9/2014 Carmignani ............. G01N 1/26
                                                  356/437
(Continued)

FOREIGN PATENT DOCUMENTS

CN      204988539 U     1/2016
CN      108069440 A     5/2018
WO      2008/106056 A1  9/2008

OTHER PUBLICATIONS

J L Bergmans et al. "Accuracy of a Tunable Diode Laser Sensor in Large Scale Furnaces: Initial Test Results", 2005 American Flame Research Committee International Symposium, Georgia Institute of Technology, Atlanta, GA, Nov. 7-8, 2005, vol. 15, Feb. 6, 2006 Abstract, first paragraph.

(Continued)

*Primary Examiner* — Avinash A Savani
(74) *Attorney, Agent, or Firm* — BakerHostetler

(57) ABSTRACT

A method is described for controlling a furnace containing a plurality of catalyst-containing tubes heated by a combustion gas generated by a plurality of burners, said method comprising the steps of: (i) measuring path-averaged combustion gas temperatures on multiple paths through the furnace using tunable diode laser absorption spectroscopy, (ii) periodically measuring temperatures of surfaces within the furnace to obtain periodic surface temperature information, (iii) entering the path-averaged combustion gas temperatures and periodic surface temperature information into a computer model of the furnace, said model comprising parameters for controlling the furnace; and (iv) using the (Continued)

computer model and the temperature information to obtain optimised parameters for controlling the furnace. A system for performing the method is also described.

14 Claims, 1 Drawing Sheet

(51) Int. Cl.
　　*B01J 19/24*　　(2006.01)
　　*C01B 3/38*　　(2006.01)
　　*F23N 1/00*　　(2006.01)
　　*G01J 5/10*　　(2006.01)
　　*G01N 21/39*　　(2006.01)
　　*G05D 23/19*　　(2006.01)
　　*G01J 5/00*　　(2022.01)

(52) U.S. Cl.
　　CPC .............. *G01J 5/10* (2013.01); *G01N 21/39* (2013.01); *G05D 23/1931* (2013.01); *B01J 2219/00157* (2013.01); *C01B 2203/0233* (2013.01); *C01B 2203/0811* (2013.01); *C01B 2203/1619* (2013.01); *F23N 2225/08* (2020.01); *G01J 2005/0077* (2013.01); *G01N 2021/399* (2013.01)

(58) Field of Classification Search
　　CPC .............. B01J 19/0033; B01J 19/2415; B01J 2219/00157; F23N 1/002; F23N 2225/08; G01J 5/10; G01J 2005/0077; G01N 21/39; G01N 2021/399; G05D 23/1931

USPC .......................................................... 431/14
　　See application file for complete search history.

(56) References Cited

U.S. PATENT DOCUMENTS

| | | | |
|---|---|---|---|
| 2007/0082407 A1* | 4/2007 | Little, III | G01N 21/359 |
| | | | 436/139 |
| 2009/0102103 A1* | 4/2009 | Thomson | F27D 21/02 |
| | | | 266/44 |
| 2010/0151397 A1* | 6/2010 | Farrell | F23N 5/18 |
| | | | 431/75 |
| 2012/0079969 A1* | 4/2012 | Tanoura | F22B 37/025 |
| | | | 431/79 |
| 2016/0313003 A1* | 10/2016 | Masterson | G01N 21/15 |
| 2018/0306444 A1* | 10/2018 | Stewart | F23N 5/242 |
| 2018/0356292 A1* | 12/2018 | Miller | F01D 25/005 |
| 2019/0360067 A1* | 11/2019 | Gangoli | F27D 99/0033 |

OTHER PUBLICATIONS

Yao Zhao et al. "A tunable diode laser sensor for temperature measurement in large-scale hydrogen generation furnaces", Light, Energy and the Environment, OSA Technical Digest, Dec. 2014 Whole Document.

Yokogawa, "Optimizing Combustion Control with the TDLS8000", 2015, https://web-material3.yokogawa.com/AN10Y03P01-51E-A.pdf Figure 5.

* cited by examiner

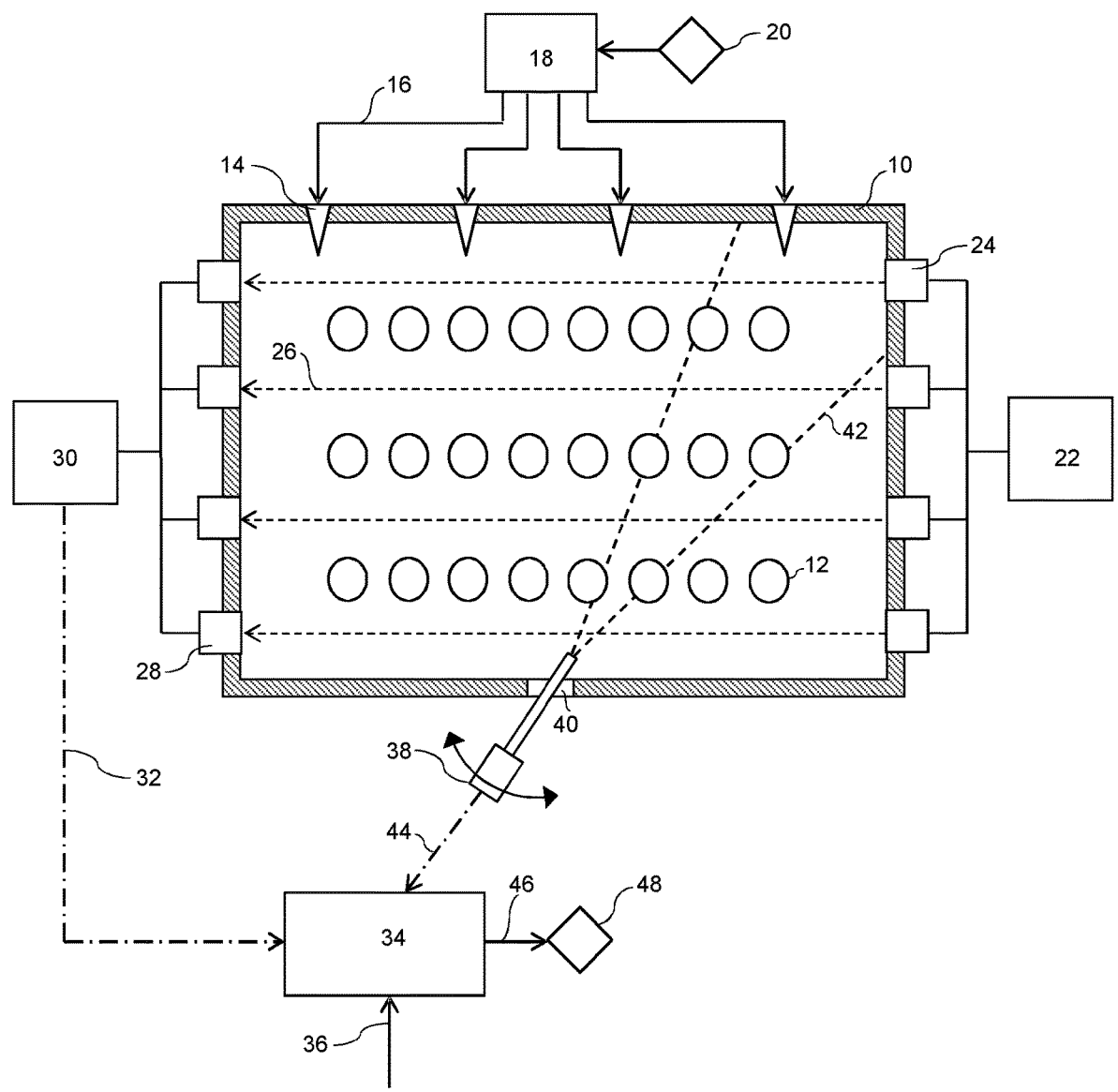

FURNACE CONTROL METHOD

The present invention relates to a method for controlling a furnace containing a plurality of tubes that are heated by a combustion gas.

Fired steam reformers are examples of furnaces in which the furnace contains a plurality of externally-heated, catalyst-filled tubes. A hydrocarbon, such as methane, is mixed with steam and the mixture passed through the tubes over a steam reforming catalyst disposed within the tubes to generate a gas mixture containing hydrogen, carbon monoxide and carbon dioxide, often termed synthesis gas. The external heating is typically provided by a combustion gas produced by combustion of a fuel using a plurality of burners arranged on the internal walls of the furnace.

Efficient operation of furnaces, including fired steam reformers, is of growing importance and mal-operation, for example resulting in hot spots on the tubes, can lead to damage to the furnace, the tubes and the catalyst. Tube wall temperatures are therefore known to have a direct influence on the lifetime of the tubes before they need to be replaced. In addition, a wide variation in tube wall temperatures can limit the allowable heat input, thereby reducing the production rate and efficiency of the furnace. Therefore, there is a need for operators to better understand the conditions within the furnace and in particular the temperatures of surfaces, especially the tube wall temperatures, and how these might be controlled to improve efficiency in the utilization of the fuel and prevent damage to the furnace, the tubes and the catalyst.

U.S. Pat. No. 8,219,247 discloses a method of operating a furnace having process tubes and multiple burners where it is desired to conform the temperatures of the process tubes to selected target temperature criterion. The method uses a plurality of digital images comprising pixel data associated with the tubes to obtain temperature information that is used to adjust burner flow rates to result in desired tube wall temperatures, for example to minimize the temperature deviation between tube wall temperatures at a predetermined elevation in the furnace.

There is a need for alternative and complimentary measurement techniques for obtaining better temperature information that may be used to control tubular furnaces having catalyst-containing tubes.

Accordingly, the invention provides a method for controlling a furnace containing a plurality of catalyst-containing tubes heated by a combustion gas generated by a plurality of burners, said method comprising the steps of: (i) measuring path-averaged combustion gas temperatures on multiple paths through the furnace using tunable diode laser absorption spectroscopy, (ii) periodically measuring temperatures of surfaces within the furnace to obtain periodic surface temperature information, (iii) entering the path-averaged combustion gas temperatures and periodic surface temperature information into a computer model of the furnace, said model comprising parameters for controlling the furnace; and (iv) using the computer model and the temperature information to obtain optimised parameters for controlling the furnace.

The invention further provides a system for controlling a furnace containing a plurality of catalyst-containing tubes heated by a combustion gas generated by a plurality of burners, said system comprising (i) tunable diode laser absorption spectroscopy apparatus configured to provide path-averaged combustion gas temperatures on multiple paths through the furnace, (ii) temperature measurement apparatus configured to periodically measure temperatures of surfaces within the furnace to obtain periodic surface temperature information, (iii) a computer model of the furnace, said model comprising parameters for controlling the furnace; and (iv) a controller for controlling the furnace using optimised parameters provided by the computer model.

The present invention uses the periodic optical temperature measurements to calibrate the computer model, thereby improving the prediction of surface temperatures from the continuous TDLAS temperature measurements, thereby providing more accurate continuous temperature monitoring of the furnace and hence quicker discovery and correction of mal-operation of the furnace.

The optimised parameters provided by the method may be used to display to a furnace operator conditions within the furnace that need corrective action, such as adjusting one or more of the plurality of burners or the feed to the catalyst-containing tubes to optimise the performance of the furnace and/or to prevent damage to the tubes or other surfaces within the furnace. Alternatively, the optimised parameters may be fed directly into a plant operating system for controlling one or more of the plurality of burners, the feed to the tubes or other controlled systems. Unlike the method described in the aforesaid U.S. Pat. No. 8,219,247, the method of the present invention is suitable for the continuous monitoring of the furnaces, which may be performed locally or remotely. Remote continuous monitoring of the furnace is particularly useful, compared to current methods.

The method and system are applied to a furnace containing a plurality of catalyst-containing tubes heated by a combustion gas generated by a plurality of burners. The furnace therefore contains a plurality of tubes, typically fabricated from high nickel-content steels. The tubes typically are between 2 and 15 metres in length and typically have an internal diameter in the range of 25-150 mm. The tubes may be arranged vertically in the furnace and so have a top end and a bottom end. Other arrangements may be used. Preferably the tubes are arranged in a regular spaced relationship and aligned in rows. The spacing of the tubes within a row may be the same or different to the spacing between the rows. The furnace preferably has paths through the furnace between the tubes, for example from one internal wall to an opposite internal wall through which the method may be applied.

The tubes will have prescribed limits of temperature and pressure, based on their materials of construction and dimensions, in order to meet their predicted tube life. The method and system of the present invention allow the furnace to be controlled to maintain the tubes within these prescribed limits. For example, the tubes may have an upper temperature limit of 1000° C. or 1350° C. at pressures in the range of 10 to 80 bar abs.

The catalyst in the tubes may be any catalyst, including particulate catalysts that provide random flow through the tubes, and/or structured catalysts in which a catalytic layer is applied to one or more ceramic or metal structures that provide non-randomised flow through the tubes.

Furnaces typically have a plurality of inspection-holes suitable for observation of the interior surfaces of the furnace, including the plurality of tubes. These inspection-holes and orifices may advantageously be used for the periodic optical temperature measurements. Whereas the existing observation-holes may be used for obtaining the TDLAS measurements, it is preferred that the TDLAS measurements are obtained by creating a plurality of additional dedicated orifices in the furnace walls through which the TDLAS measurements may be taken. The TDLAS system is therefore desirably fixed in position on the furnace and the measurements are taken from the fixed positions. The TDLAS measurements are taken on multiple paths through the furnace. The more paths that are used the more combustion gas information may be obtained. Preferably the furnace comprises at least 5 paths, more preferably at least 10 paths. Two or more of the paths may arranged be at the same or different planes through the furnace. A single plane provides two-dimensional temperature information. Using paths at different heights advantageously provides three-dimensional temperature information and is therefore preferred. Where the furnace comprises vertical tubes, the paths may be at the same height or different heights, but are preferably at different heights, to provide a three-dimensional temperature profile of the furnace. The location of the paths may be influenced by a knowledge of the typical combustion gas temperature distribution of a particular furnace type.

The tubes are heated by the combustion gas. The combustion gas is typically the product of combusting a hydrocarbon fuel with air and so the combustion gas may contain small amounts of a hydrocarbon, such as methane, oxygen and nitrogen as well as the expected combustion products carbon monoxide, carbon dioxide and steam. Other combustion products, such as one or more nitrogen oxides, e.g. NO and $NO_2$, may also be present.

The method and system use tunable diode laser absorption spectroscopy (TDLAS) apparatus configured to provide path-averaged combustion gas temperatures on multiple paths through the furnace. TDLAS uses a tunable diode laser to produce light of wavelengths that interact with molecules in the combustion gas to produce an adsorption profile that may be used to give information about the combustion gas composition and temperature. One or more tunable diode lasers may be used.

In some arrangements, the furnace may be provided with a tunable diode laser system comprising a tunable diode laser sending unit and a detector. The tunable diode laser system may include a laser module containing the tunable diode laser, a control unit containing a central processing unit programmed for signal processing as well as a temperature and current control for the tunable diode laser, and a user interface and display. The laser and/or detector preferably include an alignment device to allow alignment of the laser beam. The laser and detector may be mounted on the exterior of the furnace such that light from the laser may pass though the combustion gas to the detector. To protect the laser and detector, they are preferably thermally insulated from the combustion gas using suitable insulating windows, optionally cooled by flowing nitrogen or another suitable cooling gas. The laser beam is passed through the combustion gas to a suitable detector, such as a near infrared light detector. Detector electronics may be in electrical communication with the control unit by way of a cable or may be in communication wirelessly. The control unit may also be in electrical communication, by way of cables or wirelessly, with a process control system for controlling the furnace. One example of such a device is the TruePeak® Tunable Diode Laser analyzer available from Yokogawa Europe B.V.

The TDLAS may also be performed using a plurality of diode lasers each having a select lasing frequency; a multiplexer optically coupled to the plurality of diode lasers, the multiplexer outputting a multiplexed laser output, the multiplexed laser output being optically coupled to a proximal end of a pitch side optical fibre; a pitch optic optically coupled to a distal end of the pitch side optical fibre, the pitch optic being operatively associated with the furnace and oriented to project the multiplexed laser output through the furnace; a catch optic operatively associated with the furnace in optical communication with the pitch optic to receive the multiplexed laser output projected through the furnace; a catch side optical fibre optically coupled to the catch optic at a proximal end; a demultiplexer optically coupled to a distal end of the catch side optical fibre, the demultiplexer demultiplexing laser light of each of the select lasing frequencies; and a detector optically coupled with the demultiplexer, the detector being sensitive to one of the select lasing frequencies. Such apparatus is available commercially from John Zink Hamworthy Combustion/Zolo Technologies. Suitable apparatus is described in WO2004/090496.

The TDLAS method and system are preferably operated continuously during operation of the furnace.

The method and system desirably include processing the measurements from the TDLAS to provide continuous temperature information for the combustion gas. Accordingly, desirably the system includes processing apparatus for processing the measurements. Such processing apparatus is available with TDLAS systems. For example, the method for measuring the path-averaged combustion gas temperature on each path may comprise:

(a) passing a beam of radiation emitted by tunable diode laser along a line-of-sight path through the furnace;
(b) tuning the diode laser over two or more rotational lines of the selected species,
(c) collecting the transmitted radiation and passing the transmitted radiation to a photo detector, and
(d) processing the optical signal by observing the amount of attenuation observed from the initial beam as the laser is tuned over two or more resonance absorption lines to determine the combustion gas temperature.

The combustion gas temperature information may be obtained by applying the following expression:

$$R = \left(\frac{S1}{S2}\right)_{T0} \times \exp\left[\frac{-hc\Delta E}{k}\left(\frac{1}{T} - \frac{1}{T_0}\right)\right]$$

where R is the ratio of the integrated absorbance of each transition at the unknown temperature T. (S1/S2) is the ratio of the line-strength values at a reference temperature, $T_0$, $\Delta E$ is the energy separation of the absorbing states, h is Planck's constant, k is Boltzmann's constant and c is the speed of light. The right-hand side of the expression is composed of all known parameters except T. In step (b), whereas the species used for temperature monitoring may be CO and/or $O_2$, the preferred species is $H_2O$ because its concentration is not usually dependent on process operating conditions. Whichever species is chosen it is preferred that the dependence on process stoichiometry is minimal. For near infrared monitoring of $H_2O$, numerous absorption transitions exist in the 1.4, 1.5 and 2.0 μm spectral region that is accessible by near infrared diode lasers. The photodetector therefore is preferably sensitive to these wavelengths and may include a filter element, such as a narrow band reflector or transmitting optic and/or a dispersing element for use in suppressing background radiation from hot walls and/or particles in the combustion gas.

Unlike previous uses of TDLAS, the present invention is not primarily concerned with the optimisation of an air/fuel mixture for safe and/or efficient combustion, or the minimisation of undesirable combustion products such as nitrogen oxides. Rather, the present invention infers surface temperatures from the path-averaged combustion gas temperatures derived from the shift in the adsorption wavelength produced by the tunable diode laser. The surface may be any surface within the furnace, for example an interior wall of the furnace, a furnace roof or floor, flue-gas collection means, and the tubes. In the present invention, the surface is preferably the tube wall and the method is preferably used to determine tube wall temperatures.

The multiple paths in the method are suitably direct paths through the furnace, preferably between rows of tubes from one internal wall to an opposite internal wall. Paths may also extend between the tubes and the interior walls of the furnace. The paths may be the same or different lengths but are preferably the same length. The paths are desirably arranged to collect temperature information at multiple points along the lengths of the tubes within the furnace, for example one or more paths near a first end of the tubes, one or more paths near a second end of tubes and one or more paths at a position intermediate the first end and the second end.

In addition to providing path-averaged combustion gas temperatures, the TDLAS method and system may additionally provide information on combustion gas composition. The combustion gas composition information may be useful in controlling the furnace and therefore may also be entered into the computer model to provide optimised parameters for controlling the furnace. Carbon monoxide, gaseous water (steam) and hydrocarbons each have a spectral absorption of infrared light that exhibits unique fine structure. The individual features of the spectra are seen because of the high resolution of the tunable diode laser. For oxygen analysis, the tunable diode laser may operate at a wavelength in the range of from 759 to 779 nanometers to provide a path average oxygen concentration. By measuring two oxygen absorption peaks, the combustion gas temperature can be calculated and provided. With proper absorption line selection in the wavelength range of from 2 to 2.5 micrometers it is also possible to measure the presence of carbon monoxide, steam and hydrocarbons (methane and others) with a single tunable diode laser system. It is also possible to use multiple lasers to provide single species measurement per laser or combinations of single and multiple species measurements per laser.

The TDLAS method and system may also be applied to a convection section and/or flue-duct section of the furnace to measure temperature and/or composition of the exhaust gas from the furnace.

In addition to the TDLAS system, the present method and system utilise temperature measurement apparatus configured to periodically measure temperatures of surfaces within the furnace to obtain periodic surface temperature information. The periodic surface temperature information may be used to calibrate the computer model, improving the prediction of surface temperatures from path-average temperatures obtained by the TDLAS method, thereby providing optimised parameters for controlling the furnace. The model preferably also uses other measurements of the system, more preferably other continuous measurements. The measurements may be one or more of the flowrate, temperature, pressure, and composition of the combustion fuel, combustion air, furnace tube feed gas as well as catalyst properties, such as pressure drop and heat transfer, and furnace properties such as burner positions and exhaust gas flowrate.

The combustion gas is partially transparent, so radiative flux reaching a surface and so its temperature does not just depend on the gas temperature in the immediate vicinity of the surfaces, although typically the paths will be within 2 metres of the surfaces. The surfaces may be any surfaces within the furnace such as the furnace walls, the furnace floor or the furnace ceiling but are preferably the heated surfaces of the one or more catalyst-containing tubes.

By the term, "periodically" we mean that during TDLAS measurement of the combustion gas temperature, a temperature measurement, such as an optical temperature measurement, is taken of surfaces within the furnace in a period ranging from once per 8-24 hours to once per 600-1344 hours or once per 1000-2000 hours. After start-up of the furnace, the period between measurements may be shorter, but as the on-line time of the furnace increases, the period between measurements may become longer.

The apparatus used for the temperature measurement may be any temperature measurement apparatus such as a gold-cup pyrometer, an optical point pyrometer, or a thermal imaging camera. Preferably the temperature measurement is performed using a thermal imaging camera as this provides the most comprehensive surface temperature data for use in combination with the TDLAS method and system.

The thermal imaging camera suitably comprises a camera comprising an optical sensor; a rigid borescope comprising an elongated housing having a viewing end and a sensor end, and a multi-element relay lens assembly within the elongated housing having at least two optical pieces for directing a real image viewed by the rigid borescope to the camera, the viewing end comprising a lens, wherein the sensor end of the rigid borescope is operatively connected to the camera. The camera may be rigidly-attached to the sensor end of the borescope. The camera unit may further comprise a battery or power-source connection, a controller, and a display. Such thermal imaging cameras are commercially available, e.g. from AMTEK® Land Instruments.

In order to protect the lenses in the borescope from damage and to improve image quality, it is desirable to cool the borescope by means of a cooling fluid cool gas passing through a housing that encloses at least part of the borescope. Thus, in a preferred arrangement, the thermal imaging camera comprises an outer housing containing at least a portion of the rigid borescope extending from the viewing end of the borescope and extending towards the sensor end, the outer housing having an outlet at the viewing end and an inlet adjacent the sensor end to permit a cooling fluid, such as air, to be passed through the housing. A partition member may be present within the outer housing to prevent the cooling fluid entering the camera. Such a thermal imaging camera is described in US2017/0171418, herein incorporated by reference.

Thermal imaging cameras are manually operated and are typically used to collect images by directing the borescope connected to a digital camera unit through an inspection-hole in the furnace wall. The borescope is typically moved to capture a plurality of digital images of different parts of the interior of the furnace. The thermal imaging camera captures time-varying temperature data within a furnace in the form of a sequence of thermal images, each containing temperature data at an instant in time. For furnace temperature monitoring, the use of a thermal imager offers significant advantages over a point pyrometer, allowing large amounts of data to be captured very rapidly.

The method of using the thermal imaging camera preferably comprises capturing a plurality of images for the plurality of process tubes in the furnace, at least some images of the plurality of images being associated with different portions of the plurality of tubes in the reformer furnace, wherein each image of the plurality of images comprises pixel data associated with a respective portion of the plurality of process tubes; and processing a portion of the pixel data to obtain the temperature information for the plurality of process tubes.

The method further requires entering the path-averaged combustion gas temperatures and periodic temperature information for the surfaces into a computer model of the furnace, said model comprising parameters for controlling the operation of the furnace. The computer model may be any predictive computer model suitable for modelling a tubular furnace containing catalyst-filled tubes. Such predictive computer models are known and are described for example in, "Theory of radiative heat transfer in co-current tube furnaces", Chem. Eng. Sci. 2 (1967) 1325-1336. A model specific to steam reformer furnaces is described in, "Mathematical modelling of an industrial steam-methane reformer for on-line deployment", Fuel Processing Technology 92 (2011) 1574-1586 and references therein.

The computer model is typically programmed into a computer used to illustrate the operation of the furnace. Such programmes are available from furnace providers and catalysts vendors.

The computer model may be used to predict the behaviour of the furnace when subjected to a change in one of a number of input parameters. Suitable input parameters include the flowrate, temperature, pressure, and composition of the combustion fuel, combustion air, furnace tube feed gas as well as catalyst properties, such as pressure drop and heat transfer, and furnace properties such as burner positions and exhaust gas flowrate. The output parameters from the model include the temperature profiles of the tubes as well as the flowrate, temperature, pressure, and composition of combustion gas, and furnace tube product gas.

The present method and system supplement the input parameters by providing combustion gas temperature information at multiple points in the furnace and surface temperatures at multiple points in the furnace. The method and system use the computer model and the temperature information to provide optimised parameters for controlling the furnace. The furnace may be controlled, for example, by the adjustment of one or more of the plurality of burners to increase or decrease its heat output or by the increase or decrease of the heat demand by adjusting the flowrate of reactants through the plurality of catalyst-containing tubes. In particular, the method and system may use the computer model and the temperature information to provide optimised parameters for controlling one or more of the plurality of burners.

The controller may be a conventional control unit that controls the variable parameters, including a burner control unit that adjusts the flow of fuel and air to one or more of the plurality of burners. There may be one or more controllers on the fuel gas and/or one or more controllers on the air. The "controllers" can be manual (e.g. valves/registers) or automatic. The burner control unit or units may be used to open or close one or more valves used to control the flow of fuel and air to one or more of the plurality of burners, for example as described in the aforesaid U.S. Pat. No. 8,219,247.

In the present invention, the furnace containing a plurality of catalyst-containing tubes is preferably a fired steam reformer, in which the tubes contain a steam reforming catalyst.

The steam reformer may be a fired steam reformer, such as a top-fired or side-fired steam reformer. In a steam reformer, a feed gas comprising hydrocarbon feedstock and steam, and optionally carbon dioxide, is passed through externally heated, catalyst-filled tubes to reform the hydrocarbon into a crude synthesis gas containing hydrogen, carbon monoxide, carbon dioxide and steam. In a fired steam reformer, the catalyst-filled tubes are externally heated by combusting a fuel gas with air. The heating of the tubes is primarily by radiation. A steam reforming catalyst typically comprises nickel at levels in the range 1-30% by weight, supported on refractory oxides, such as alpha alumina or magnesium- or calcium aluminates, in the form of pellets, often having one or more through-holes. The pellets are randomly packed in the reformer tubes. Alternatively, or additionally, structured catalysts, wherein a nickel or precious metal catalyst is provided as a surface layer coating on a formed metal or ceramic structure that provides a directed, non-random flow through the tubes, may be used. Alternatively, the catalyst may be provided in a plurality of containers disposed within the reformer tubes. Steam reforming reactions take place in the tubes over the steam reforming catalyst at temperatures above 350° C. and typically the process fluid exiting the tubes is at a temperature in the range 650-950° C. The steam reformer is fired, i.e. the tubes are heated by the combustion of a gaseous fuel, such as natural gas or other combustible gases, with air. The hot gases may have a temperature in the range 900-1300° C. The pressure may be in the range 10-80 bar abs.

For a fired steam reformer, the method preferably comprises the following stages a) continuous monitoring of combustion gas temperature and composition using TDLAS apparatus, b) periodic monitoring of tube wall temperatures using a thermal imaging camera or other temperature measurement apparatus, and c) reformer adjustment in response to these measurements.

The continuous monitoring may comprise the following sequence of steps:

Step 1. Measure path-averaged combustion gas temperatures and compositions on multiple paths through the reformer using Tunable Diode Laser Absorption Spectroscopy, followed by;

Step 2. Reconciling the measured path-averaged combustion gas temperatures, compositions and other process measurements using a mathematical model of the reformer in conjunction with any standard parameter estimation technique, followed by;

Step 3. Comparing predicted tube wall temperatures with prescribed limits for the tube walls at predefined points within the reformer. If the predicted temperature at any point is outside the prescribed limits go to step 8 below; otherwise continue to step 4.

Step 4. If less than a pre-determined number of days have elapsed since completion of step 6 below, repeat from step 1; otherwise continue to step 5.

The periodic monitoring steps may comprise the following sequence of steps:

Step 5. Measuring the tube wall temperatures within the reformer using a thermal imaging camera, followed by;

Step 6. Re-estimating parameters in the reformer model using the measured path-averaged combustion gas temperatures and compositions, other process measurements and the measured tube wall temperatures using any standard parameter estimation technique, followed by;

Step 7. Comparing the measured tube wall temperatures with prescribed limits for the tube walls at the same points within the reformer. If the measured temperature at any point is outside the prescribed limits go to step 8 below; otherwise repeat from step 1.

The reformer adjustment steps may comprise:

Step 8. Determining proposed adjustments to reformer operation such that the predicted tube wall temperatures lie within their prescribed limits through constrained optimisation of the reformer model using any standard optimisation technique, followed by;

Step 9. Adjusting the operation of the reformer based on these proposed adjustments and repeating from step 1.

The invention will now be further described by reference to the drawings in which:

FIG. 1 is a depiction of a system according to the present invention.

It will be understood by those skilled in the art that the drawings are diagrammatic and that further items of equipment such as feedstock drums, pumps, vacuum pumps, compressors, gas recycling compressors, temperature sensors, pressure sensors, pressure relief valves, control valves, flow controllers, level controllers, holding tanks, storage tanks and the like may be required in a commercial plant. Provision of such ancillary equipment forms no part of the present invention and is in accordance with conventional chemical engineering practice.

In FIG. 1 there is a horizontal cross-section of a fired steam reformer furnace 10 containing rows of vertical catalyst-containing tubes 12. The tubes are fed with a mixture of hydrocarbon and steam that is reformed over a steam reforming catalyst disposed within the tubes to form synthesis gas. Whereas twenty-four tubes are depicted in three rows, typically the reformer will comprise hundreds of tubes in tens of rows. The tubes 12 are heated by a plurality of burners 14 that combust a fuel gas with air fed by feed lines 16. The feed lines are controlled by a controller 18, which opens and closes valves (not shown). The controller 18 is fed with a series of input instructions from an operator or plant control system 20.

The furnace 10 is fitted with a TDLAS system comprising a TDLAS laser controller 22 that controls a plurality of laser sources 24 attached to the exterior wall of the furnace. The laser sources 24 emit beams of laser light along a plurality of paths 26 through the furnace 10 between the rows of tubes 12 and between the rows of tubes and interior walls of the furnace. The laser light interacts with components of the combustion gas and is detected by a plurality of detectors 28 located on the furnace wall opposite the sources 24. The detectors 28 are connected to a processing unit 30 that processes the output from the detectors to provide TDLAS temperature information 32 for each of the paths 26.

The TDLAS temperature information 32 is provided to a computer model programmed into a computer 34. The model in the computer is also fed with furnace operating parameters 36 including the flowrate, temperature, pressure, and composition of the combustion fuel, combustion air, furnace tube feed gas, catalyst properties, and furnace properties.

The method and system further include a thermal imaging camera 38 directed through one or more inspection ports 40 present in the walls of the furnace 10. The thermal imaging camera captures a plurality of digital thermal images of surfaces within the furnace, including surfaces of the tubes 12. The position of the thermal imaging camera 38 is adjusted, for example as depicted by the arrow, to move its field of view 42 to capture thermal images of the tubes 12. The thermal imaging camera 38 produces surface temperature information 44 for each of the plurality of tubes. The surface temperature information 44 is provided to the computer model in the computer 34.

The surface temperature information 44 is used by the computer model in the computer 34 to calibrate the TDLAS temperature information 32. The TDLAS temperature information 32 is collected at least during continuous steady-state operation of the furnace. The thermal imaging camera surface temperature information 44 is collected periodically while the TDLAS temperature information 32 is being collected.

The computer model in the computer 34 provides optimised output parameters 46 for operation of the furnace. The optimised parameters from the model include the temperature profiles of the tubes as well as the flowrate, temperature, pressure, and composition of combustion gas, and furnace tube product gas. The optimised parameters provide output control instructions 48, that are used to adjust the input control instructions 20 for the burner control unit 18.

The invention claimed is:

1. A method for controlling a furnace containing a plurality of catalyst-containing tubes heated by a combustion gas generated by a plurality of burners, said method comprising the steps of: (i) measuring path-averaged combustion gas temperatures on multiple paths through the furnace using tunable diode laser absorption spectroscopy, (ii) periodically measuring temperatures of surfaces within the furnace to obtain periodic surface temperature information, (iii) entering the path-averaged combustion gas temperatures and periodic surface temperature information into a computer model of the furnace, said model comprising parameters for controlling the furnace; and (iv) using the computer model and the temperature information to obtain optimised parameters for controlling the furnace, wherein the furnace is a fired steam reformer.

2. The method according to claim 1 wherein the surfaces include surfaces of the catalyst-containing tubes.

3. The method according to claim 1 wherein the path-averaged combustion gas temperatures are measured continuously during operation of the furnace.

4. The method according to claim 1 wherein the tunable diode laser absorption spectroscopy is performed using a tunable diode laser system comprising a tunable diode laser sending unit and a detector.

5. The method according to claim 1 wherein the tunable diode laser absorption spectroscopy additionally provides information on the combustion gas composition that is entered into the computer model.

6. The method according to claim 1 wherein the periodic surface temperature information is measured using a gold-cup pyrometer, an optical point pyrometer, or a thermal imaging camera.

7. The method according to claim 1 wherein the optimised parameters are used to adjust one or more of the plurality of burners, or to adjust the feed to the catalyst-containing tubes or to adjust other systems of the furnace.

8. A system for controlling a furnace containing a plurality of catalyst-containing tubes heated by a combustion gas generated by a plurality of burners, said system comprising (i) tunable diode laser absorption spectroscopy apparatus configured to provide path-averaged combustion gas temperatures on multiple paths through the furnace, (ii) temperature measurement apparatus configured to periodically measure temperatures of surfaces within the furnace to obtain periodic surface temperature information, (iii) a computer model of the furnace, said model comprising parameters for controlling the furnace; and (iv) a controller for controlling the furnace using optimised parameters provided by the computer model, wherein the furnace is a fired steam reformer.

9. The system according to claim 8 wherein the surfaces include surfaces of the catalyst-containing tubes.

10. The system according to claim 8 wherein the tunable diode laser absorption apparatus comprises a tunable diode laser sending unit and a detector.

11. The system according to claim 8 wherein the temperature measurement apparatus is selected from a gold-cup pyrometer, an optical point pyrometer, or a thermal imaging camera.

12. The method according to claim 8 wherein the controller is configured to adjust one or more of the plurality of burners, or to adjust the feed to the catalyst-containing tubes or to adjust other systems of the furnace.

13. The method according to claim 1 wherein the periodic surface temperature information is measured using a thermal imaging camera.

14. The system according to claim 8 wherein the temperature measurement apparatus is a thermal imaging camera.

\* \* \* \* \*